Dec. 16, 1941.   H. C. WELTER   2,266,108
COMBINED CLUTCH AND MITER GEAR
Filed June 15, 1939
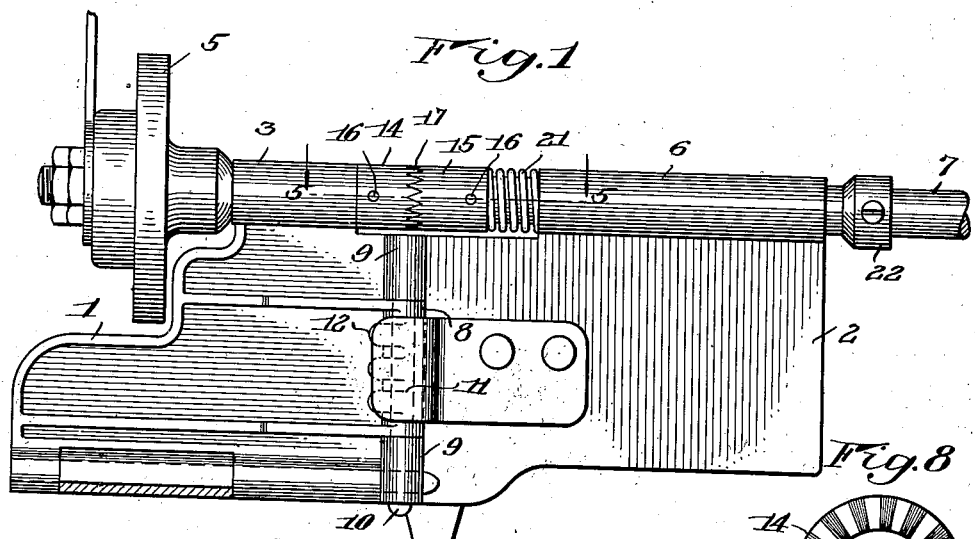
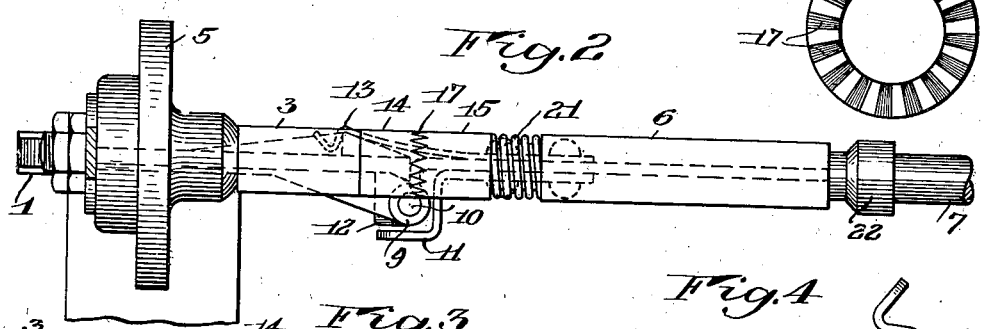
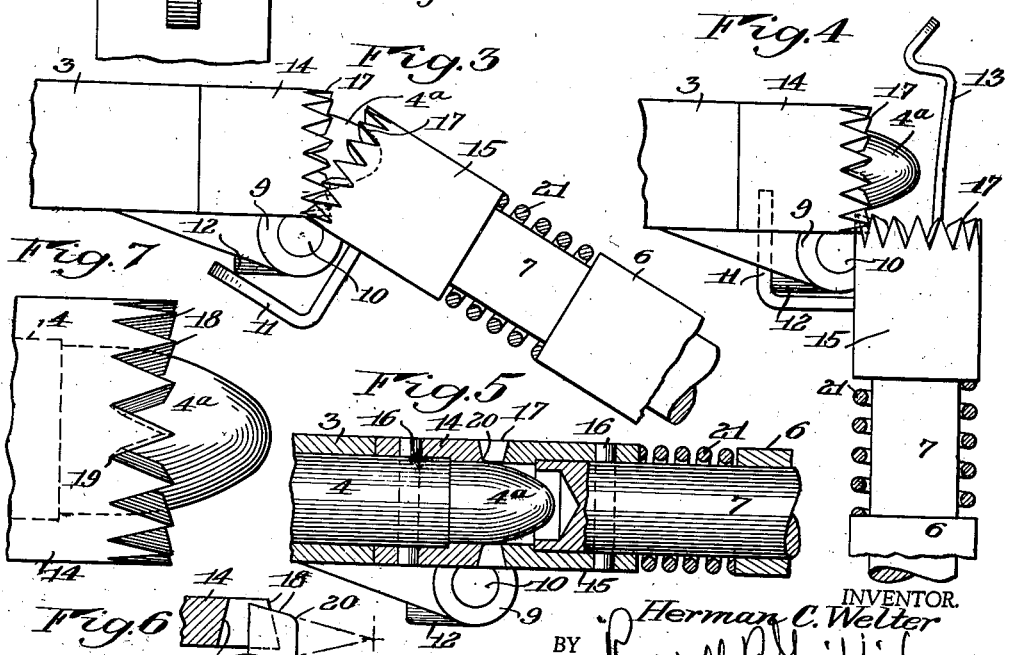
INVENTOR.
Herman C. Welter
BY Russell B. Griffith
his ATTORNEY.

Patented Dec. 16, 1941

2,266,108

UNITED STATES PATENT OFFICE 2,266,108

COMBINED CLUTCH AND MITER GEAR

Herman C. Welter, Rochester, N. Y., assignor to The Dawn Mfg. Corp., Rochester, N. Y., a corporation of New York Application June 15, 1939, Serial No. 279,258

2 Claims. (Cl. 74—330)

My present invention relates to mechanical movements and more particularly to clutches and similar gearing, and it has for its object to provide a simple and efficient combined clutch and gear mechanism which will lock two shafts together to turn as one when the shafts are in alinement but which will also act in the capacity of miter gearing to rotate the driven shaft when the driving shaft is turned so that its axis is at an angle, including an extreme angle, to that of the driven shaft. To these and other ends, the invention resides in certain improvements and combinations of parts, all as will be hereinafter more fully described, the novel features being pointed out in the claims at the end of this specification.

In the drawing:

Fig. 1 is a side view of a driven and driving shaft couple, the bearings of which are mounted for relative swinging movement, the shafts being provided with combined clutch and gear elements constructed in accordance with and illustrating one embodiment of my invention;

Fig. 2 is a top view thereof;

Fig. 3 is an enlarged fragmentary top view showing the meshing of the clutch elements as miter gears when the shafts are swung at a moderate angle;

Fig. 4 is a similar view showing the shafts swung to an extreme or right angle;

Fig. 5 is an enlarged fragmentary horizontal section taken substantially on the line 5—5 of Fig. 1;

Fig. 6 is a further enlarged sectional detail showing the tooth engagement present in Fig. 4;

Fig. 7 is also a further enlarged fragmentary detail side view of the male clutch element on the driven shaft, and Fig. 8 is an end view of the latter.

Similar reference numerals throughout the several views indicate the same parts.

It is immaterial in the scope of this invention what application is made thereof, but to give a clear idea of an instance of its utility, I have shown it embodied in a copyholder structure for typewriters of the nature shown in my Patent No. 2,171,261 dated August 29, 1939, the application, Serial No. 223,598, filed August 8, 1938, for which patent was copending herewith. In fact, this application is a continuation in part of that application.

To briefly review the related problem presented by such a copyholder construction and referring more particularly to the drawing, 1 indicates a portion of the base of the copyholder standard that sets back of the typewriting machine and 2 a portion of a side arm that extends forwardly at the side of the machine as a forward brace. The base element 1 includes a bearing 3 containing an actuating shaft 4 that is the driven shaft of the present couple carrying as it does a friction wheel 5 that imparts motion to the line indicating mechanism of the copyholder. The side arm element 2 has a bearing 6 at the top normally alined with bearing 3 in which turns a driving shaft 7. This driving shaft is the operating shaft and is turned manually by the user from a remote forward point adjacent to the keyboard of the typewriting machine.

When the copyholder is shipped, stored or even temporarily out of use, it is desirable to reduce its bulk by folding the side arm element 2 and its appurtenances at right angles close against the face of the copy plate, for which purpose the elements 1 and 2 are provided with knuckles 8 and 9 respectively, by which they are hinged together on a vertical pintle 10. A spring leaf 11 on element 2 rides on two relatively angular faces of a lug 12 on element 1 to retain the parts in either the straight or the extreme extended position and in the first mentioned or operative position a spring latch 13 is additionally employed.

In the practice of my present invention, the forward end of the driven shaft 4 and the rear end of the driving shaft 7 are respectively provided with complementary clutch elements 14 and 15. These are tubular, are pinned on the shafts at 16 and their interengaging proximate faces constitute, in each case, an annular series of serrational teeth 17.

These teeth are believed to be of novel formation and are carefully contrived in order to effect the objects first above expressed. The details of their characteristics are important. As shown best in Figs. 7 and 8, the individual tooth, in each instance, has side faces generated by radii true to the center of rotation while moving divergently axially and resulting in the end ridges 18 being inclined from the greater diameter of the element inwardly acutely toward the center. Also, the cutter that forms the teeth is itself so formed and manipulated that in the cut the valleys 19 at the bases of the teeth are inclined outwardly (longitudinally of the axis) and convergently with relation to the ridges 18 so that the resulting teeth are shorter on the inside circumference of the annulus than on the outside circumference thereof, as best shown in Fig. 6.

The result of all this is that when the couple is engaged as a clutch with the axes identical, as in Figs. 1, 2 and 5, the respective sides of opposite teeth engage throughout their contacting surfaces, being true complements of each other in every respect and a strong and perfect clutching action takes place.

When it is desired to dispose the operating or driving shaft 7 at an angle to the driven or actuating shaft 4, as in Fig. 3, the elements 14 and 15 remain sufficiently in mesh with respect to a lesser group of cooperating teeth to convert themselves into a geared couple performing the functions of miter gears so that the driving action is nearly as smooth and quite as effective as it was before. This is because the axis of the pintle 10 is in a plane parallel to one that is in the pitch line of the teeth and therefore is substantially tangent thereto though offset a little, as shown, according to the depth to which the teeth are cut and other considerations. At any rate, this axis is so located that the teeth remain in mesh even in the extreme folded position of Fig. 4 where the respective axes of the shafts and clutch elements are at right angles and even in that position motion can still be communicated effectively, smoothly and uniformly. Although it would be unusual to wish to operate a copyholder from such folded position of the operating arm, there are other applications of the mechanical movement as broadly claimed herein in which it might be highly desirable. In the movement to these positions of relative angularity and between them and the full clutch position, other reason is seen for the inclination of the valleys 19 between the teeth and as shown by Fig. 6 it permits the high point on a tooth of the movable element 15 to clear the bases of the cooperating teeth on the opposite member.

For the purpose of further centering the clutch elements accurately, the driven shaft 4 has a bluntly tapered or rounded projecting end 4ª that takes into the annulus presented by the opposite clutch member 15 whose shaft 7 extends only partially into the clutch tube, as shown in Fig. 5. The inner tips 20 of the ridges of the teeth (Fig. 6) are slightly rounded, as shown, to accord with this provision.

To insure the close cooperation of the two sets of teeth at all times, whether they are locked in clutching relationship or merely meshed more or less in geared relationship, I prefer to mount the movable or swinging clutch element 15 under spring pressure which also acts to compensate for slight manufacturing irregularities, such as an imperfect location of the axis of pintle 10. To this end, a short but relatively strong expansion and compression spring 21 is coiled about the shaft 7 to act against the outer end of element 15 and to react against the bearing 6 of that shaft. Its tendency is, of course, to slide the whole shaft longitudinally and its expanding effect for the purposes stated is limited by a stop collar 22 adjustably fixed to that shaft.

In the true clutching or maximum engagement of the elements 14 and 15, as in Figs. 1, 2 and 5, this spring is under maximum compression but when the angular relationships of the other figures are assumed the spring expands as in Figs. 3 and 4 until halted by stop collar 22 abutting the end of bearing 6. This leaves the teeth of the respective elements in the proper mesh without such jamming as would interfere with the freedom of their sliding cooperation one with the other.

As before stated, my reference to a copyholder structure specifically is entirely incidental as the invention is primarily a mechanical movement adaptable to many environments and uses.

I claim as my invention:

1. The combination with a driven shaft, a driving shaft, bearings for the respective shafts and a hinge connection between said bearings extending transversely of the axis of the shafts, of clutch elements on the respective shafts movable toward and from complete clutch engagement with each other as the bearings are articulated on the hinge, said elements comprising sharp pointed teeth adapted to also hold partial engagement with each other for rotational gear meshing on extreme relatively angular axial positions of the shafts and bearings and the axis of the hinge being offset from the plane of the pitch circle of the intermeshed teeth but otherwise substantially parallel to a tangent thereto.

2. The combination with a driven shaft, a driving shaft, bearings for the respective shafts, in one of which one of the shafts is permitted limited axial movement, and a hinge connection between said bearings extending transversely of the axis of the shafts, of clutch and gear elements on the respective shafts movable toward and from complete clutch engagement with each other as the bearings are articulated on their hinge, said elements comprising sharp pointed teeth adapted to also hold partial engagement with each other for rotational gear meshing on extreme relatively angular axial positions of the shafts and bearings and the axis of the hinge being offset from the plane of the pitch circle of the intermeshed teeth but otherwise substantially parallel to a tangent thereto, and a compression spring acting between the clutch element of the axially movable shaft and its bearing to maintain both clutch and gear engagements.

HERMAN C. WELTER.